US007401228B2

(12) United States Patent
Sako et al.

(10) Patent No.: US 7,401,228 B2
(45) Date of Patent: Jul. 15, 2008

(54) METHOD FOR TRANSMITTING DATA, APPARATUS FOR RECORDING DATA, MEDIUM FOR RECORDING DATA, AND APPARATUS FOR REPRODUCING DATA

(75) Inventors: Yoichiro Sako, Chiba (JP); Yoshitomo Osawa, Kanagawa (JP); Akira Kurihara, Tokyo (JP); Isao Kawashima, Kanagawa (JP); Hideo Owa, Kanagawa (JP)

(73) Assignee: Sony Corporation, Tokyo (JP)

( * ) Notice: Subject to any disclaimer, the term of this patent is extended or adjusted under 35 U.S.C. 154(b) by 804 days.

(21) Appl. No.: 10/211,499

(22) Filed: Aug. 2, 2002

(65) Prior Publication Data

US 2003/0023861 A1    Jan. 30, 2003

Related U.S. Application Data

(63) Continuation of application No. 09/310,252, filed on May 12, 1999, now Pat. No. 6,463,153, which is a continuation of application No. 08/678,907, filed on Jul. 12, 1996, now abandoned.

(30) Foreign Application Priority Data

Jul. 14, 1995    (JP)    ................................. 07-201654

(51) Int. Cl.
*G06F 11/00*    (2006.01)
(52) U.S. Cl. ........................ 713/187; 713/176; 713/189; 380/22; 380/287; 726/26; 714/756; 714/766; 714/38

(58) Field of Classification Search ......... 714/756–766, 714/783, 784, 800, 48, 52, 752, 38; 713/168, 713/189, 150, 152, 193, 176, 187; 380/255, 380/287, 22; 726/26
See application file for complete search history.

(56) References Cited

U.S. PATENT DOCUMENTS 4,074,066 A      2/1978  Ehrsam et al.
4,295,218 A  *  10/1981  Tanner ........................ 714/762

(Continued)

FOREIGN PATENT DOCUMENTS

EP    0 755 055    1/1997

*Primary Examiner*—Kristine Kincaid
*Assistant Examiner*—Yin-Chen Shaw
(74) *Attorney, Agent, or Firm*—Frommer Lawrence & Haug LLP; William S. Frommer; Thomas F. Presson

(57) ABSTRACT

A data transmitting method, a data recording apparatus, a data record medium and a data reproducing apparatus are provided to disallow the encryption to be easily decoded and keep the secrecy of key information higher. The data transmitting apparatus includes an error correction coding process block. In the block, an input converting circuit operates to perform a logic operation with respect to the information data from an interface circuit 12 according to the key data. The converted information data is sent to an encoder 15 for generating parity data. This parity data is mixed with information data before conversion in a mixing circuit. The error correction coding block operates to send the resulting data to a modulating circuit 17 for modulating the data. The modulated data is recorded on a disk record medium.

14 Claims, 11 Drawing Sheets

U.S. PATENT DOCUMENTS

| | | | |
|---|---|---|---|
| 4,608,456 A | 8/1986 | Paik et al. | |
| 4,754,482 A * | 6/1988 | Weiss | 713/181 |
| 4,760,599 A | 7/1988 | Okamoto et al. | |
| 4,768,106 A * | 8/1988 | Ito et al. | 386/56 |
| 4,794,643 A | 12/1988 | Saeki et al. | |
| 5,014,274 A * | 5/1991 | Higurashi et al. | 714/768 |
| 5,144,658 A | 9/1992 | Takahashi | |
| 5,150,401 A | 9/1992 | Ashby, III et al. | |
| 5,285,497 A | 2/1994 | Thatcher, Jr. | |
| 5,319,649 A | 6/1994 | Raghavan et al. | |
| 5,408,478 A | 4/1995 | Ohmori et al. | |
| 5,408,531 A | 4/1995 | Nakajima | |
| 5,450,248 A * | 9/1995 | Van Eijck et al. | 360/32 |
| 5,479,299 A * | 12/1995 | Matsumi et al. | 386/54 |
| 5,506,903 A | 4/1996 | Yamashita | |
| 5,546,461 A * | 8/1996 | Ibaraki et al. | 380/217 |
| 5,550,640 A * | 8/1996 | Tsuboi et al. | 386/35 |
| 5,587,803 A * | 12/1996 | Inoue et al. | 386/33 |
| 5,615,266 A | 3/1997 | Altschuler et al. | |
| 5,627,844 A | 5/1997 | Cho | |
| 5,638,227 A * | 6/1997 | Hamai et al. | 360/48 |
| 5,719,943 A * | 2/1998 | Amada et al. | 380/202 |
| 5,799,081 A * | 8/1998 | Kim et al. | 380/203 |

* cited by examiner

US 7,401,228 B2

METHOD FOR TRANSMITTING DATA, APPARATUS FOR RECORDING DATA, MEDIUM FOR RECORDING DATA, AND APPARATUS FOR REPRODUCING DATA

CROSS REFERENCE TO RELATED APPLICATIONS

This is a continuation of U.S. patent application Ser. No. 09/310,252, filed May 12, 1999 now U.S. Pat. No. 6,463,153, which is a continuation of application Ser. No. 08/678,907, filed Jul. 12, 1996, now abandoned.

BACKGROUND OF THE INVENTION

1. Field of the Invention

The present invention relates to a method for transmitting data, an apparatus for recording data, a record (recording, recordable or recorded) medium, and an apparatus for reproducing data all of which are suitable to preventing illegal copying or incorrect use or applicable to a charging system.

2. Description of the Related Art

In recent days, with increase of capacity and prevail of a digital record medium like an optical disk, great significance has been placed on preventing illegal copying and inhibiting incorrect use of such a medium. Concretely, the digital audio data or the digital video data can be easily copied into a complete duplication with no degrade The computer data can be also more easily reproduced as the same data. In actual, hence, illegal copied data takes place in the market.

To prevent illegal copying of digital audio data or digital video data, the so-called SCMS (Serial Copy Management System) or CGMS (Copy Generation Management System) standards have been known. These standards are arranged so that a copy prohibitive flag is set to a specific portion of the recorded data. Even with these standards, hence, the data is allowed to be taken out by a method such as a dump copy.

As disclosed in Japanese Laid-open No. Showa 60-116030, another method has been proposed for encrypting a content of a computer data file and granting the encrypted content to registered users only. This method concerns with the system arranged to take the steps of distributing a digital record medium on which the encrypted data is recorded or making the encrypted digital data accessible to any user through a wired or wireless transmission path as a distributing format of data and providing the users having paid for the fee with key data for the necessary. Data so that these users may decode the encrypted digital data and use the data. It is thus desirable to establish the simple and useful encryption.

SUMMARY OF THE INVENTION

The present invention is made in consideration of the aforementioned circumstances. It is an object of the present invention to provide a method for transmitting data, an apparatus for recording data, a record (recording, recordable or recorded) medium, and an apparatus for reproducing data that are arranged so that the data may be encrypted with simple composition but only the registered users can access key data for the encrypted data.

To solve the foregoing problems, the present invention is characterized to transmit or record information data containing parity data by converting all or part of the information data handled in doing error correction or error detection coding for input digital data, and all or part of the information data obtained without doing the data conversion. The data conversion contains a logic operation, an inversion, or a replacement of the information data according to key information or data for encryption.

A medium for recording data according to an aspect of the invention is characterized to record the parity data and the information data.

A method for reproducing data according to an aspect of the invention is characterized to perform data conversion with respect to at least part of data treated in the process of error correction or error detection coding according to the key information for encryption and then perform data conversion with respect to the data according to the key information for encryption contained in the data treated in the process of the error correction or error detection decoding corresponding to the above process.

In operation, the data reproducing method is arranged to transmit or record on the record (recording, recordable or recorded) medium information data containing parity data obtained by converting the information data treated in the process of error correction or error detection coding based on the key information or key data and all or part of the information data that is not converted. The key information concerns with only the parity data or part of the information data. The key information cannot be detected from these data.

According to the present invention, the information data treated in the process or error correction coding or error detection coding is converted according to the key information for encryption for generating a parity. The operation is executed to output the information data containing this parity data and all or part of the information data before conversion. Hence, no key information is leaked out of the output data, so that the encryption may be done by using the key information with high secrecy.

Further, in the process of error correction coding, the key can be encrypted with a great number of bits. The encryption is realized in a huge black box such as an error correction coding or decoding IC or LSI. This, hence, makes it quite difficult for the ordinary persons to decode the encrypted data, thereby greatly improving the data security

DESCRIPTION OF PREFERRED EMBODIMENTS

Later, the invention will be described along the preferred embodiments with reference to the appended drawings.

Figure 1:
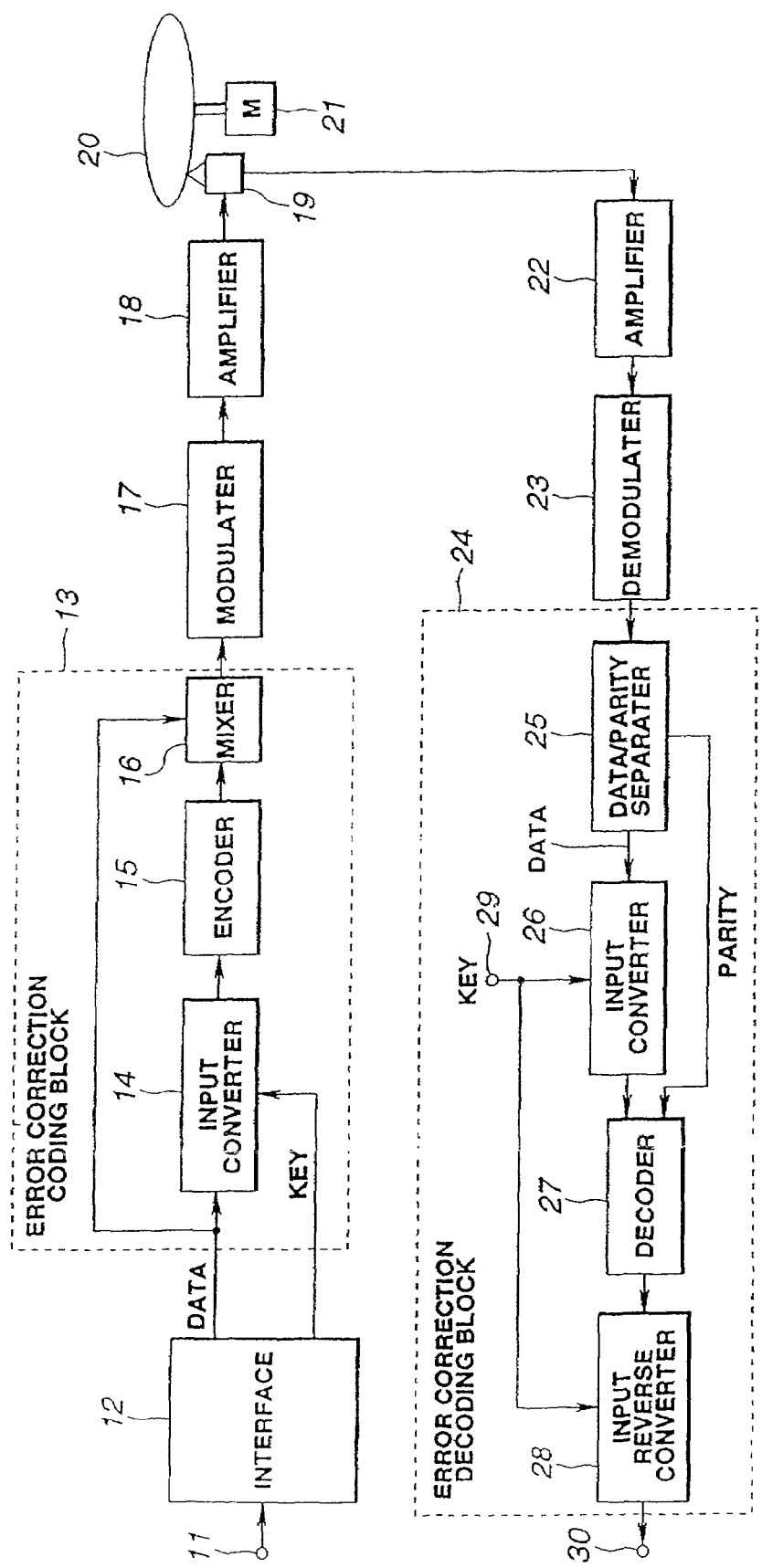
FIG. 1 is a block diagram showing a schematic arrangement of an apparatus for recording data according to an embodiment of the present invention.

FIG. 1 is a block diagram schematically showing an apparatus for recording and reproducing data according to an embodiment of the present invention.

In FIG. 1, a numeral 11 denotes an input terminal at which is supplied digital data such as computer data or data digitized from an analog audio or video signal. The input digital data is sent to an error correction coding block 13 through an interface circuit 12. The interface circuit 12 operates to send the key information or data for encryption as well as the digital data to the error correction coding block 13. That is, for example, a portion of the digital data which is extracted from thereof is used as the key information.

As shown, the error correction coding block 13 contains an input converting circuit 14, an error correcting encoder 15 and a mixing circuit 16. The input converting circuit 14 operates to convert the digital data sent through the interface circuit 12 based on the key information or data for encryption and then send the converted data to the error correcting encoder 15. The encoder operates to generate an error correcting code, that is, the so-called parity, from the converted data sent from the input converting circuit 14 and then send only the parity to the mixing circuit 16 The mixing circuit 16 receives as another data the original data component (called "information data") that is the digital data sent from the interface circuit 12 to the input converting circuit 14. The original data component is mixed with the parity. The mixed output from the mixing circuit 16 is sent to a modulating circuit 14 as an output from the error correction coding block 13.

The modulating circuit 17 operates to modulate the 8-bit data into the data consisting of 16-channel bits according to the predetermined modulating system. The modulated data is sent to a recording head, herein, a recording and reproducing head 19 through an amplifier circuit 18 for driving the recording head. The recording and reproducing head 19 operates to optically or magneto-optically record the data when recording the signal. With this head 19, the modulated signal is recorded on a disk record (recording, recordable or recorded) medium 20 such as an optical disk or a magneto-optical disk. This disk record medium 20 is rotated by a spindle motor 21

When reproducing the data, the disk record medium 20 is also rotated by the spindle motor 21 so that the content recorded on the medium is read by a reproducing head unit such as an optical pickup unit, herein, the recording and reproducing head 19.

The digital signal read by the head 19 is sent to an amplifier circuit 22 containing an RF amplifier and a phase-locked loop (PLL). Tie digital signal from the amplifier circuit 22 is sent to the demodulating circuit 23 in which the signal is demodulated. Concretely, the data consisting of 16-channel bits is converted into the data of 8 bits. The digital data from the demodulating circuit 23 is sent to the error correction decoding block 24, in which the digital data is decoded in a reverse manner to the coding process don in the error correction coding block 13.

In an error correction decoding block 24, at first, a data/parity separating circuit 25 operates to separate the parity from the original data component contained in the digital data supplied from the demodulating circuit 23, that is, the information data. The information data is sent to a decoder 27 through an input converting circuit 26 for performing the same processing as the input converting circuit 14. The decoder 27 performs the reverse decoding process to the encoder 15 based on the information data and the parity and then sends the decoded data into an input inversion circuit 28. The input inversion circuit 28 operates to perform the inversion process to the input converting circuit 14 or 26 with respect to the input information data sent from the decoder 28. Then the resulting reproduced information data is sent to an output terminal 30 as an output from the error correction decoding block 24. In the input converting circuit 26 or the input inversion circuit 28, the key information used in the error correction coding block 13 is supplied to the circuit 26 or 28 through an input terminal 29. Based on the information data, the data conversion or the reverse data conversion is carried out The embodiment shown in FIG. 1 applies to the process of recording and reproducing data on and from the disk record medium 20. The present invention may apply to the general process of transmitting data.

In turn, the description will be oriented to the principle of operation on which the error correction coding block 13 or the error correction decoding block 24 is operated with reference to FIG. 2. In FIG. 2, to make the description simple, the arrangement shown in FIG. 2 concerns with the error correction or detection coding at a bit unit in the case of a Galois field GF(2).

Figure 2A:
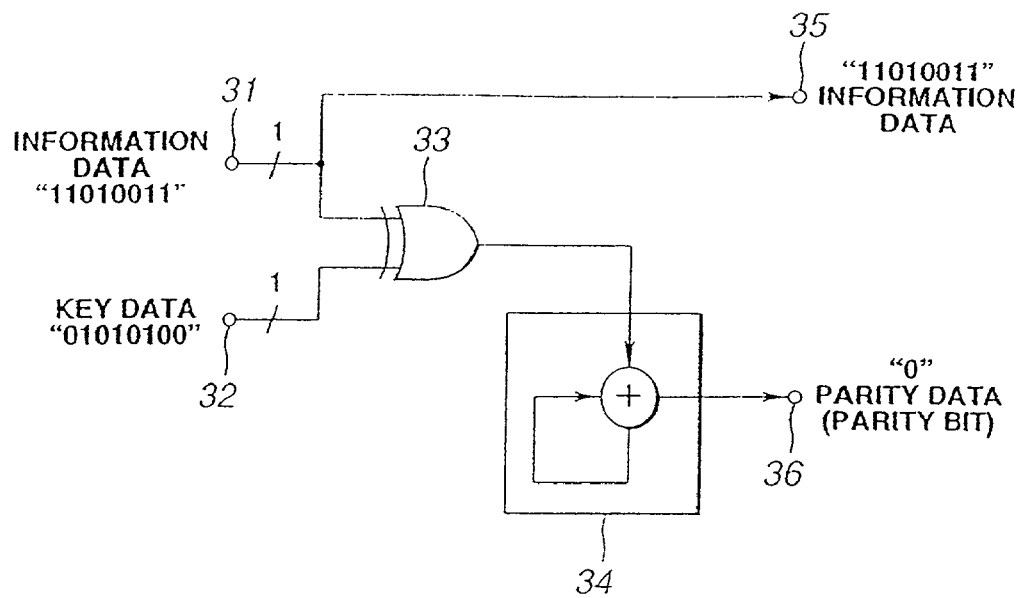
FIG. 2 is a circuit diagram for describing a principle of operation of error correction coding according to an embodiment of the present invention.

In FIG. 2A, the information data of 8 bits is supplied to an input terminal 31. The predetermined key data of 8 bits such as "01010100" ("54h" in hexadecimal digit) is supplied to an input terminal 32. The information data and the key data are sent to a logic operation circuit for data conversion such as an ExOR circuit 33 in which an ExOR of both data is taken. The resulting data is sent to a parity generating circuit 34 for generating a parity that is an error correcting or detecting code. The 8-bit information data from the input terminal 31 is picked from an output terminal 35 without any transformation and the parity data from the parity generating circuit 34 is picked from an output terminal 36. That is, after the data conversion is done in the ExOR circuit 33, the parity data obtained from the parity generating circuit 34 and the information data that is not converted as mentioned above are picked up at the terminals 36 and 35, respectively. In addition, the parity generating circuit 34 operates to take an ExOR of each bit of the input information data and then output the ExOR value.

Figure 2B:
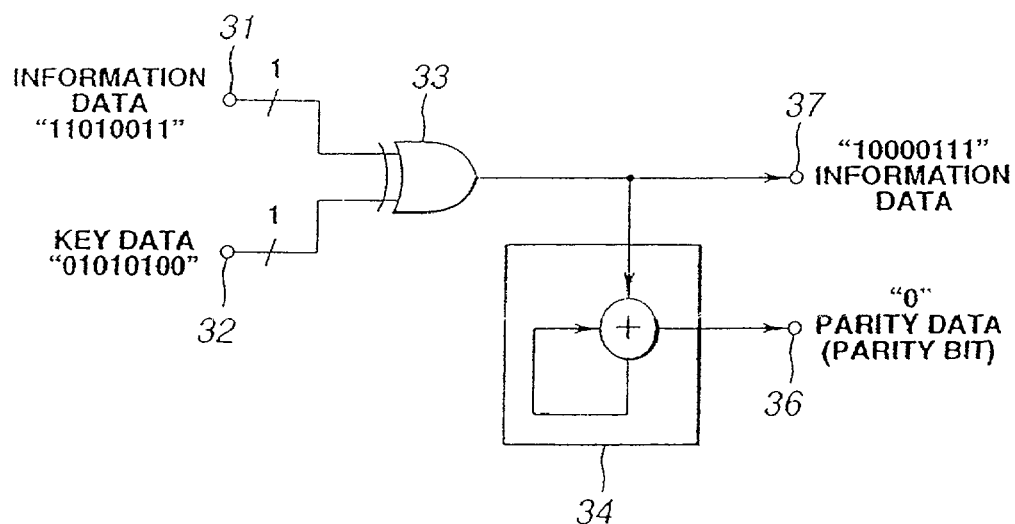

As a comparison to the above one, the arrangement shown in FIG. 2B may be considered. In the comparison as shown in FIG. 2B, in place of the information data picked at the output terminal 35 of FIG. 2A, the information data converted by the ExOR circuit 33 is picked at the output terminal 37. The other part of the arrangement is the same as that as shown in FIG. 2A.

The arrangements as shown in FIGS. 2A and 2B are compared with each other as taking as an example the 8-bit information data consisting of "11010011" ("D3h" in hexadecimal digit").

When the 8-bit information data is "11010011", the parity data corresponding to an ExOR of each bit, herein, the parity bit is "1". If the 8-bit information data is converted according to the key data of "01010100", that is, the information data is converted by taking an ExOR of each bit in the ExOR circuit 33, the resulting information data is "10000111". This information data is sent to the parity generating circuit 34 in which the parity data is derived as "0" In the arrangement shown in FIG. 2B, the ExOR circuit 33 operates to output the converted information data and the relevant parity data. Hence, if the original information data is grasped, the relevant key data can be accessed. In particular, if many pieces of data of all zeros "00000000" are contained in the information data, it is more likelihood that the key data can be leaked.

On the other hand, in the arrangement shown in FIG. 2A, the output information data is the data that is not converted. Only the parity data is obtained on the information data converted according to the key information. Hence, the trace of the key data is left only in the parity data. It indicates that the secrecy of the key data is quite high.

The embodiment of this intention uses the principle shown in FIG. 2A. The output information data may contain the converted information data if it contains at least part of the original information data. That is, all the output information data is not required to be the original information data that is not converted. FIG. 2 shows a bit-by-bit error correcting or detecting code on the Galois field GF (2). In the case of treating the data at each of four bits, it is an error correcting or detecting code on the Galois field GF ($2^1$) In the case of treating the data at each of eight bits, that is, at a byte unit, it is an error correcting or detecting code on the Galois field GF ($2^5$). In addition to the simple parity as shown in FIG. 2. the error correcting or detecting code may be a Hamming code, a CRC (Cyclic Redundancy Check) code, a BCH (Bose-Chaudhuri-Hocquenghem) code, a Reed-Solomon code or a Goppa code. In principle, the principle shown in FIG. 2 may be applied to any error correcting or detecting code if it generates the parity.

Turning to FIG. 1, consider that a Reed Solomon code of (170, 156, 15) is applied to the error correcting code used in the encoder 15 contained in the error correction coding block 13. In this case, the generated polynomial may be expressed as follows.

$$\prod_z (X - \alpha)$$

where the root of the primitive polynomial is P(x)=$x^8$+$x^1$+$x^3$+$x^2$+1 is a, that is, P(a)=0.

The 14-byte parity data is uniquely derived, that is, generated from the information data consisting of 156 bytes, while the information data consisting of 156 bytes cannot be restored from the 14-byte parity data. Hence, if the encrypted key information or key data is invisibly buried in this parity data as mentioned above. None can restore the information data except persons who know the key data. As such, since the process of generating an error correction code takes a form of a unidirectional function. It is possible to realize the encryption of the information data with a key of high secrecy.

That is, the information data consisting of 156 bytes is converted through the effect of the invert control or the ExOR control based on the key information or the key data. The parity is generated from the converted information data, so that no conversion through the key data is executed in the information data itself. Hence, none can find out the key in the information data When the data is reproduced, if the error correction decoding is executed without being known the key data, the overall information data is made erroneous or the error correction of the information data is disabled.

Further, the present invention may apply to a double error correction coding method as well. This application makes it possible to build a stronger encrypting system or security system. In this case, the generated polynomials $g_{C_1}(x)$ and $g_{C_2}(x)$ of the two C1 and C2 encoders are expressed as follows:

$$g_{c1}(X) = \prod_{l=0}^{7} (x - \alpha^l)$$

$$g_{c1}(X) = \prod_{l=0}^{13} (X - \alpha^l)$$

where a root of P(x)=$x^6$+$x^4$+$x^2$+1 is a, that is, P(a)=0.

Figure 3:
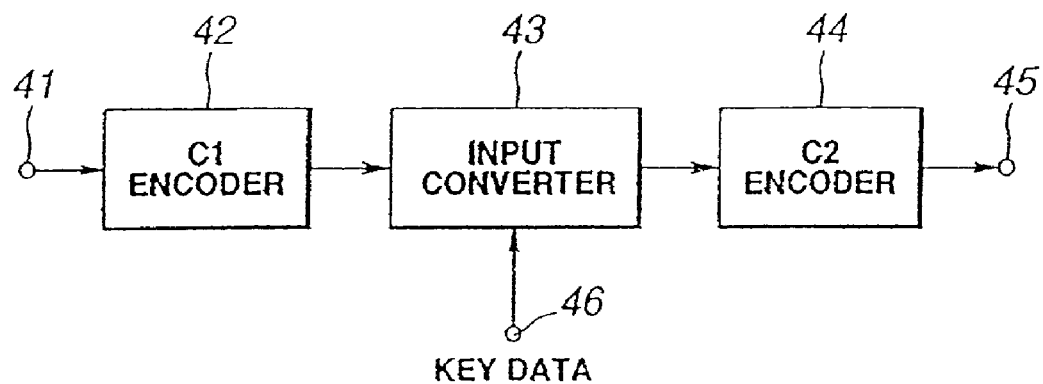
FIG. 3 is a block diagram showing a basic arrangement of double error correction coding.

This double error correction coding, as shown in FIG. 3, is executed by using the C1 encoder 42 and the C2 encoder 44 for the error correction coding. The information data is supplied to the input terminal 41 and then is sent to the C1 encoder 42 served as a first encoder. The C1 encoder 42 operates to generate a pre determined error correction code or the parity data. The information data and the parity data are sent from the C1 encoder 42 to an input converting circuit 43. The circuit 43 operates to perform the data conversion based on the key data for encryption applied at a terminal 46. This data conversion is executed by performing a logic operation on the information data and the key data. The logic operation may be an AND (logical product), an OR (logical sum), an ExOR (exclusive logical sum), an NOR, an NAND, or an Invert. The output is sent from the input converting circuit 46 to the C2 encoder 44. The C2 encoder 44 operates to generate the predetermined error correction code or the parity data, which is picked up at an output terminal 45.

Figure 4:
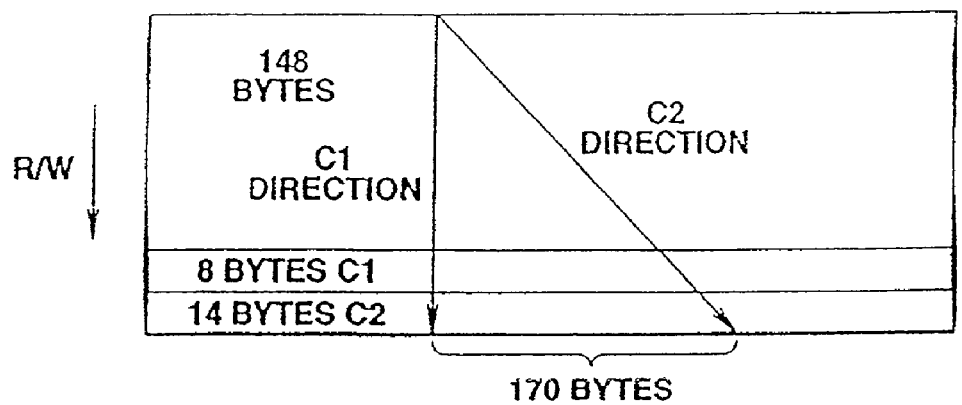
FIG. 4 is a view for describing an example of a cross interleave type code of the double error correction codes.

The error correction codes generated by the C1 encoder 42 and the C2 encoder 44 are cross interleave type codes as shown in FIG. 4. In the example as shown in FIG. 4, the information data consisting of 148 bytes are located in the R/W direction. The 8-byte C1 code is generated in the Cl direction parallel to the R/W direction. The 14-byte C2 code is generated in the C2 direction so that a shift or a delay of maximum 170 bytes is caused in the direction perpendicular to the C1 direction.

Figure 5:
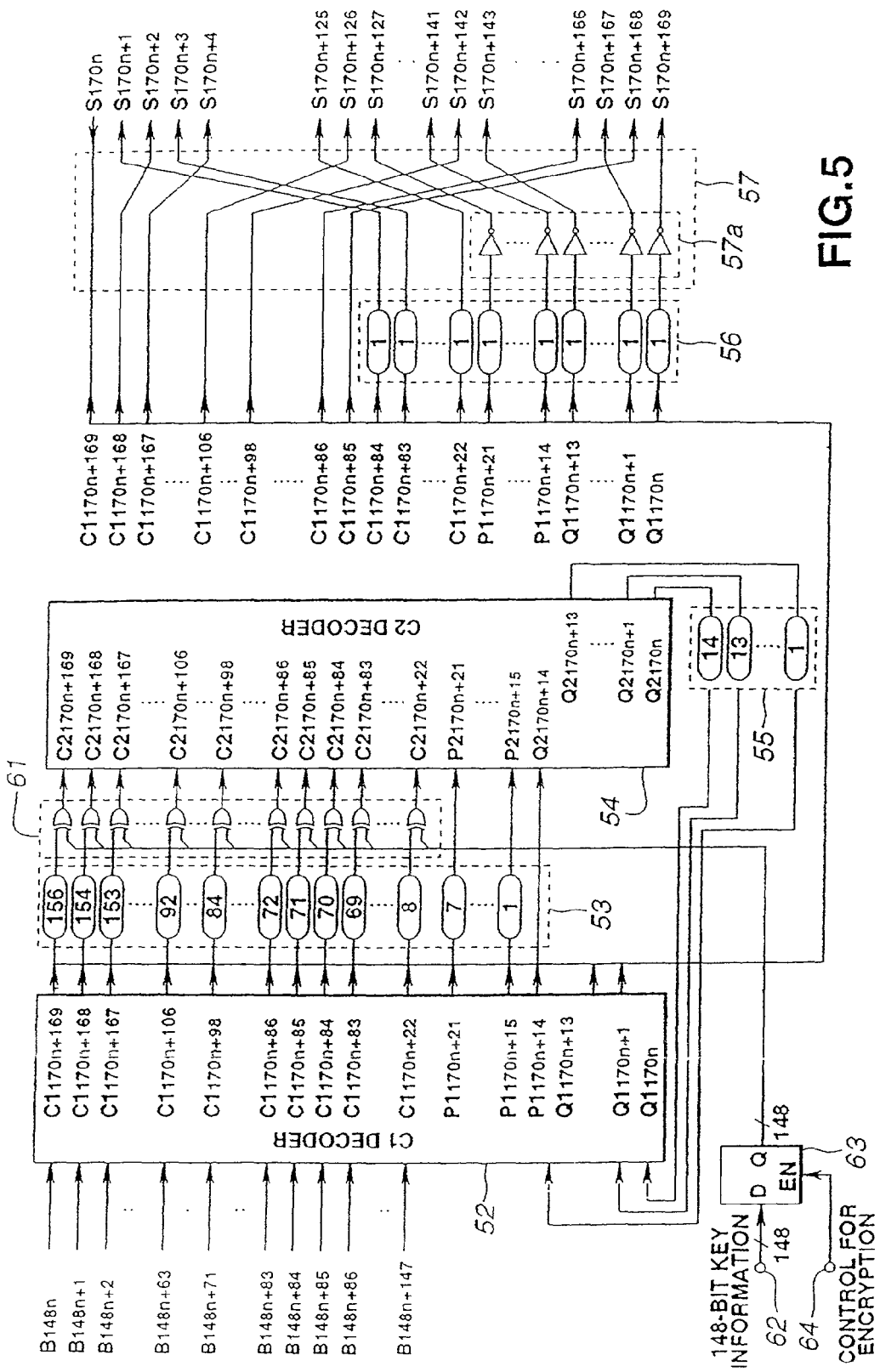
FIG. 5 is a diagram showing a concrete arrangement of an error correction coding block.

Then, the description will be oriented to a concrete arrangement of an error correction coding block for performing the double error correction coding with reference to FIG. 5.

In FIG. 5, one frame used in the error correction coding is composed of 148-byte or 148-symbol information data. The input digital information data is collected as a group of 148 bytes. Each group is supplied to the C1 encoder 52 served as the first encoder. In the C1 encoder 52, the 8-byte P parity data is added to each group. The group with the parity data is sent to the C2 encoder 54 served as the second encoder through a delay circuit 53 for interleaving. A numeral 61 denotes an input converting circuit that is provided between the delay circuit 53 and the C2 encoder 54. This input converting circuit 61 performs a logic operation based on the key information or the key data with respect to the 148-byte information data contained in the 156-byte data sent from the delaying circuit 53. The logic operation may be an ExOR operation, for example. The operated result is sent to the C2 encoder 54. The C2 encoder 54 operates to add a Q parity of 14 bytes to the operated result. The Q parity is fed back to the C1 encoder 52 through the delaying circuit 56. In the C1 encoder 52, 170-bytes information data containing the P and the Q parities are taken out and output through a delaying circuit 56 and an re-ordering circuit 57 having an inverter 57a. The circuit arranged as shown in FIG. 5 may be used in place of the error correction coding block 13 shown in FIG. 1. The information data from the interface circuit shove in FIG. 1 is sent to the C1 encoder 52. The key data from the interface circuit is sent to a terminal 62. At a time, the output from the circuit shown in FIG. 5 is sent to the modulating circuit 17 shown in FIG. 1.

In this type of error correction coding circuit, the input converting circuit 61 arranged to perform the encryption is composed of 148 8-bit ExOR circuits, each of which serves to perform an ExOR operation between the 8-bit input data and the 1-bit control data. In FIG. 5, the 148-bit key information is supplied to the terminal 62 and to 148 8-bit ExOR circuits contained in the input converting circuit 61 through the so-called D latch circuit 63. The D latch circuit 63 operates to switchably send the 148-bit key information from the terminal 62 to the input converting circuit 61 or make all 148 bits zero. In the 148 ExOR circuits contained in the input converting circuit 61, the ExOR circuit operates to directly output the information data from the delaying circuit 53 if it receives zero from the D latch circuit 63 or output the inverted information data from the delaying circuit 53 if it receives one from the D latch circuit 63. If all the 148 bits are made zero, the 148-byte information data from the delaying circuit 53 is directly sent to the C2 encoder 54.

In the arrangement shown in FIG. 5, the C2 encoder 54 operates to generate the Q parity by using the converted information data but output the non-converted information data sent from the C1 encoder 52. As mentioned above, hence, only the parity data contains the key information behind itself. This makes it possible to enhance the secrecy of the key information.

Figure 6:
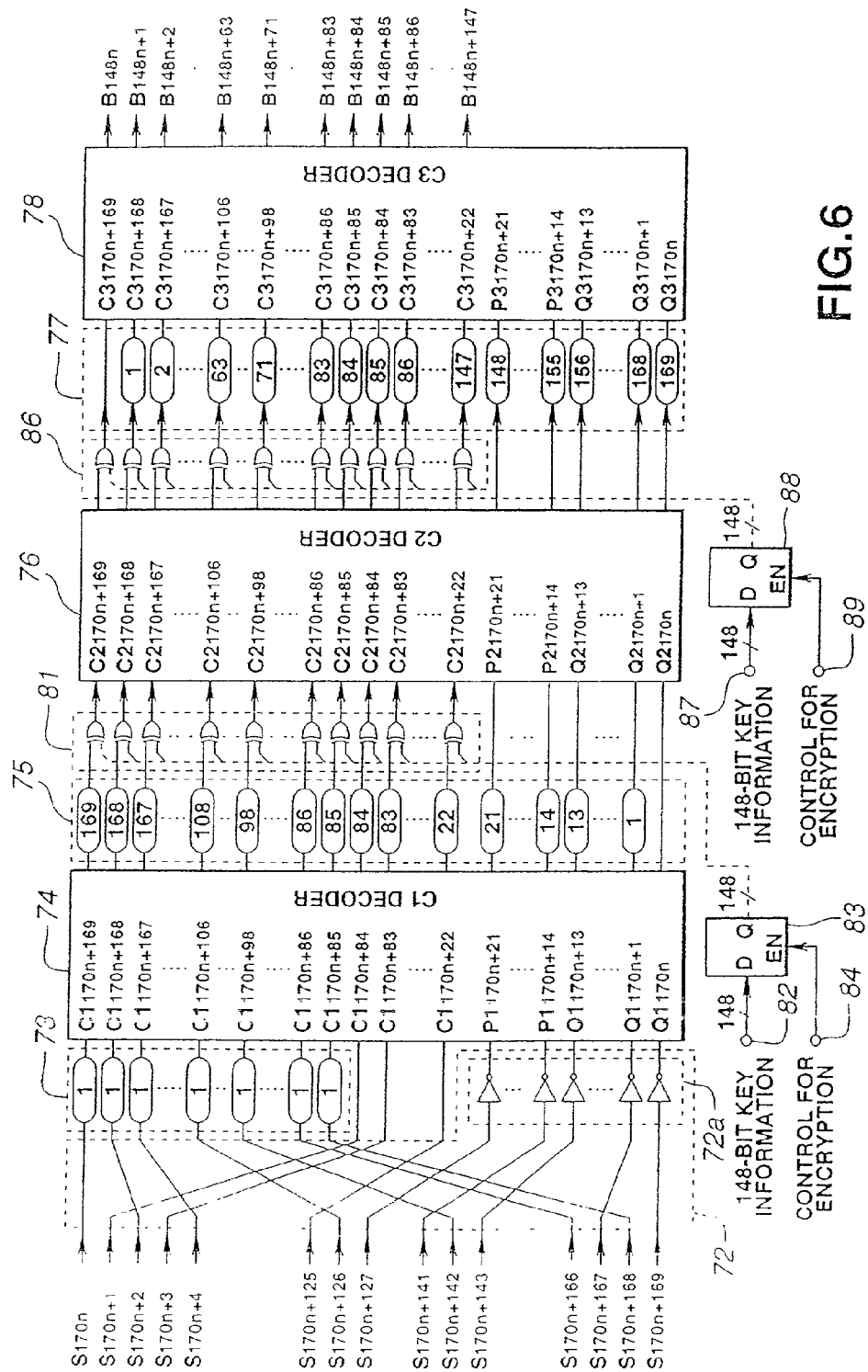
FIG. 6 is a diagram showing a concrete arrangement of an error correction decoding block.

FIG. 6 shows a concrete arrangement of an error correction decoding block provided on the reproduction side for the error correction coding block shown in FIG. 5. The circuit shown in FIG. 6 may be used in place of the error correction decoding block 24 shown in FIG. 1.

In FIG. 6. The error correction decoding block receives a group of 170 bytes or symbols contained in the data demodulated by the demodulating circuit 23 shown in FIG. 1. The group of 170 bytes or symbols is sent to a C1 decoder 74 served as a first decoder through a re-ordering circuit 72 and a delaying circuit 73. The re-ordering circuit 72 provides an inverter 72a. In the 170-byte data fed to the C1 decoder 74, the P and Q parities occupy 22 bytes. In the C1 decoder 74, the error correction decoding is executed by using these parities. The C1 decoder 74 operates to output the 170-byte data and send it to the C2 decoder 76 served as a second decoder through the delaying circuit 75. Of the data from the delaying circuit 75, 148 bytes are sent to the C2 decoder 76 through the input converting circuit 81. This input converting circuit 81 performs the same data conversion as the input converting circuit 61 shown in FIG. 5 based on the key information or the key data consisting of 148 bits fed to the terminal 82. In the C2 decoder 76, the error correction decoding is executed by using the parity data. Of the output data from the C2 decoder 76, the information data consisting of 148 bytes is sent to the delaying circuit 77 through an input inversion circuit 86 as keeping the parity data of 22 bytes intact. The C3 decoder 78 served as a third decoder performs the last error correction decoding with respect to the data from the delaying circuit 77. This decoding provides 148-byte data with no parity. This 148-byte data is decoded as the data corresponding to the 148-byte data input to the C1 encoder 52 shown in FIG. 5.

This type of error correction decoding circuit provides the input converting circuit 81 arranged to solve the encryption. The circuit 81 is composed of 148 8-bit ExOR circuits, each of which performs an ExOR operation on the 8-bit input data and the one-bit control data. As shown in FIG. 6, the key information consisting of 148 bits is fed to the terminal 82. Then, the key information is sent to each of 148 8-bit ExOR circuits contained in the input converting circuit 81 through the so-called D latch circuit 83. The D latch circuit 83 switches the operation of sending the 148-bit key information from the terminal 82 to the input converting circuit 81 or making all of 148 bits zero, based on a one-bit encrypting control signal supplied to an enable terminal 84. In the 148 ExOR circuits contained in the input converting circuit 81, an ExOR circuit operates to directly output the information data sent from the delaying circuit 75 if it receives zero from the D latch circuit 83, while another ExOR circuit operates to output the inverted information data sent from the delaying circuit 75 if it receives one from the D latch circuit 83. If all of the ExOR circuits receive zero, those circuits operate to send the 148-byte information data from the delaying circuit 75 to the C2 decoder 76 as keeping the data intact.

In the input inversion circuit 86, like the key information supplied to the terminal 82, the key information consisting of 148 bits is supplied to the terminal 87. This 148-bit key information is sent to 148 8-bit ExOR circuits contained in the input inversion circuit 86 through the D latch circuit 88. The D latch circuit 88 operates to switch the operation of sending 148-bit key information or making all the bits zero. In the input inversion circuit 86, this operation makes it possible to return the information data converted in the input converting circuit 81 to the original data. If the input converting circuit 81 uses a group of ExOR circuits, the input inversion circuit 86 needs to just perform the same control as the input converting circuit 81. The D latch circuits 83 and 88 may be the same one.

To compose the input converting circuits 61, 81 and the input inversion circuit 86, it is possible to use a group of AND, OR, NAND, NOR and invert circuits except the 8-bit ExOR circuits. In addition to the 8-bit logic operation based on the one-bit key information or key data, the logic operation may be performed with respect to the 8-bit information data by using the 8-bit key data. Further, for each one of 8 bits corresponding to one word of the information data, it is possible to use a selective combination of an AND, an OR, an ExOR, an NOR, and an invert circuit. In this case, for the 148-byte information data, that is, the information data consisting of 148 8 bits, the key data consisting of 148 8 bits is used. In the case of using the combination of the AND, the OR, the ExOR, the NAND, the NOR and the invert circuit, it is possible to use the combination itself as the key. Except the logic operation, change of locations of data or replacement of data values may be used as the input conversion or the data conversion.

In the case of using the AND, the OR, the NAND, and the NOR circuits, the use of the logically operated output data and the key data often makes it impossible to restore the original information data. That is, in the case of the AND operation, if the output data is zero and the key data is zero, the original information data cannot be clearly grasped because the original information data may have any one of "0" and "1" in that condition. Even in this case, the system according to this embodiment of the invention is arranged to transmit or record the information data obtained without doing a logic operation. Hence, the system is advantageous in restoring the original information data. That is, as compared with the output of the information data logically operated by the AND circuit or the like in place of the ExOR circuit 33 as shown in FIG. 2B, the system according to the embodiment of the invention as shown in FIG. 2 is more advantageous in positively restoring the original information data. In addition to the above-indicated logic operations, hence, it is possible to use another kind of data conversion such as a function of f: $x–x^2$.

Figure 7:
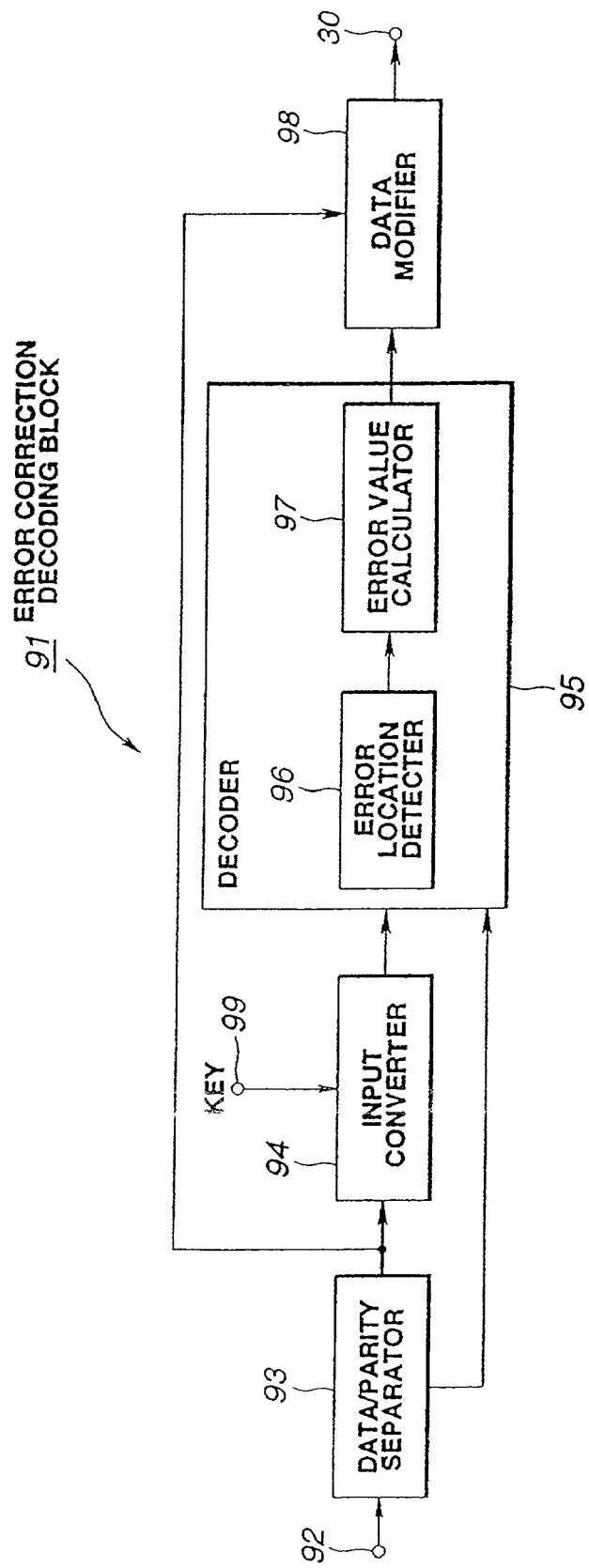
FIG. 7 is a block diagram showing a schematic arrangement of another arrangement of an error correction decoding block.

If the foregoing data conversion is executed so that the original data is made obscure, the error correction decoding block on the reproducing side may use an error correction decoding block 91 arranged as shown in FIG. 7.

In the error correction decoding block 91 as shown in FIG. 7, the data is supplied from the demodulating circuit 23 shown in FIG. 1 to an input terminal 92 and then to a data/parity separating circuit 93. The data/parity separating circuit 93 operates to separate the input data into the information data and the parity data so that the information data is sent to an input converting circuit 94 and a data modifying circuit 98 and the parity data is sent to a decoder 95. The input converting circuit 94 operates to convert the information data based on the key information or the key data sent from the terminal 99 and then sends the converted information data to a decoder 95. The decoder 95 includes an error location detector 96 and an error calculating circuit 97. The error location detector 96 operates to detect an error location based on the information data and the parity data. Then, the error calculating circuit 97 derives a difference between the data before error correction and the data after error correction as an error value through the effect of the ExOR operation. This error value is sent to a data modifying circuit 98. The data modifying circuit 98 operates to Exclusive-OR the information data before conversion sent from the data/parity separating circuit 98 with the error value for modifying the data. The modified information data is taken out at an output terminal 30.

Figure 8:
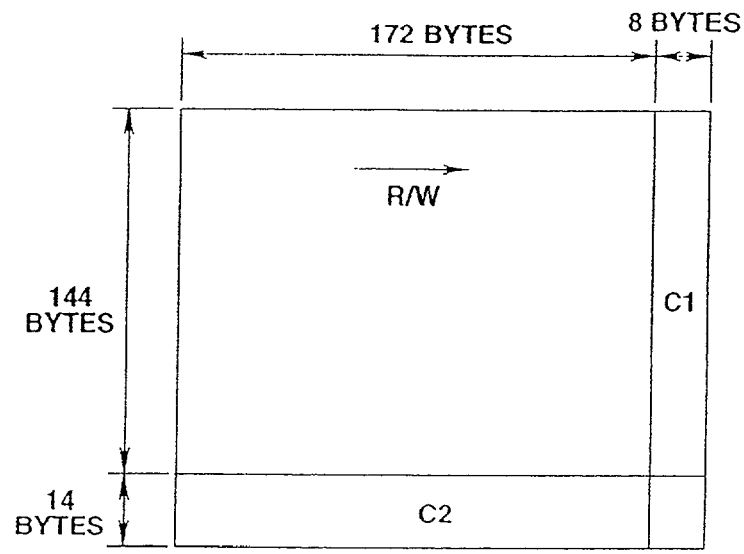
FIG. 8 is a view for describing an example of a product code of the double error correction codes.
Figure 9:
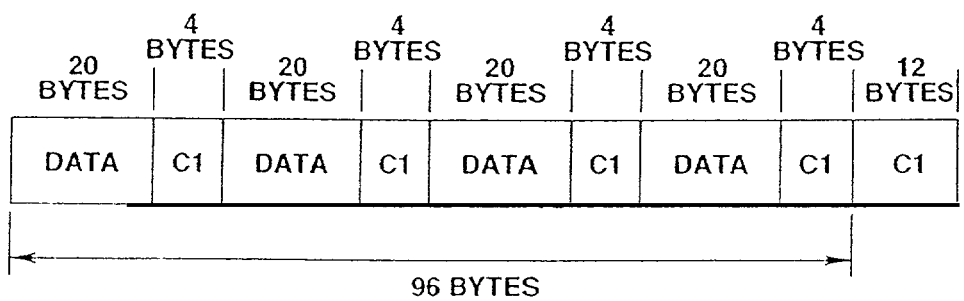
FIG. 9 is a view for describing an example of an inner code outer code of the double error correction codes.

Further, the double coding method may apply to a product code shown in FIG. 8 or an inner code/outer code shown in FIG. 9 in addition to the foregoing cross interleave type. Concretely, the product code has a matrix arrangement consisting of the information data of 144 bytes+C2 parity of 14 bytes in vertical and the information data of 172 bytes+C1 parity of 8 bytes in horizontal. The parity is generated by using the information data converted in one direction or both directions. The parity data are output together with information data that is not converted. For the inner code/outer code as shown in FIG. 9, for one or both of a four-byte C1 inner code generated about 20-byte information data and a 12-byte C2 outer code generated as four groups of the C1 inner codes, that is, 96 bytes about the data, the parity is generated by using the converted information data. Then, this parity and the information data that is not converted are output together.

In the foregoing embodiments, the numeric values may be adjusted to any value. The system operates to output all the information data that is not converted as the information data. However, the part of the information data may be converted. The partially converted information data may be output, transmitted or recorded.

Figure 10:
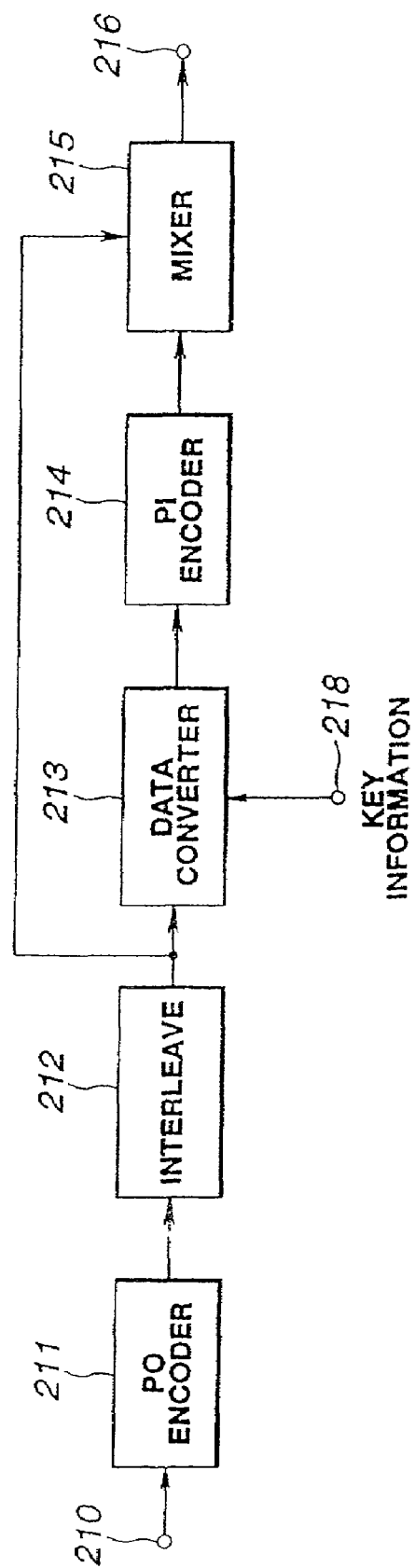
FIG. 10 is a block diagram showing another arrangement of an error correction coding circuit.
Figure 11:
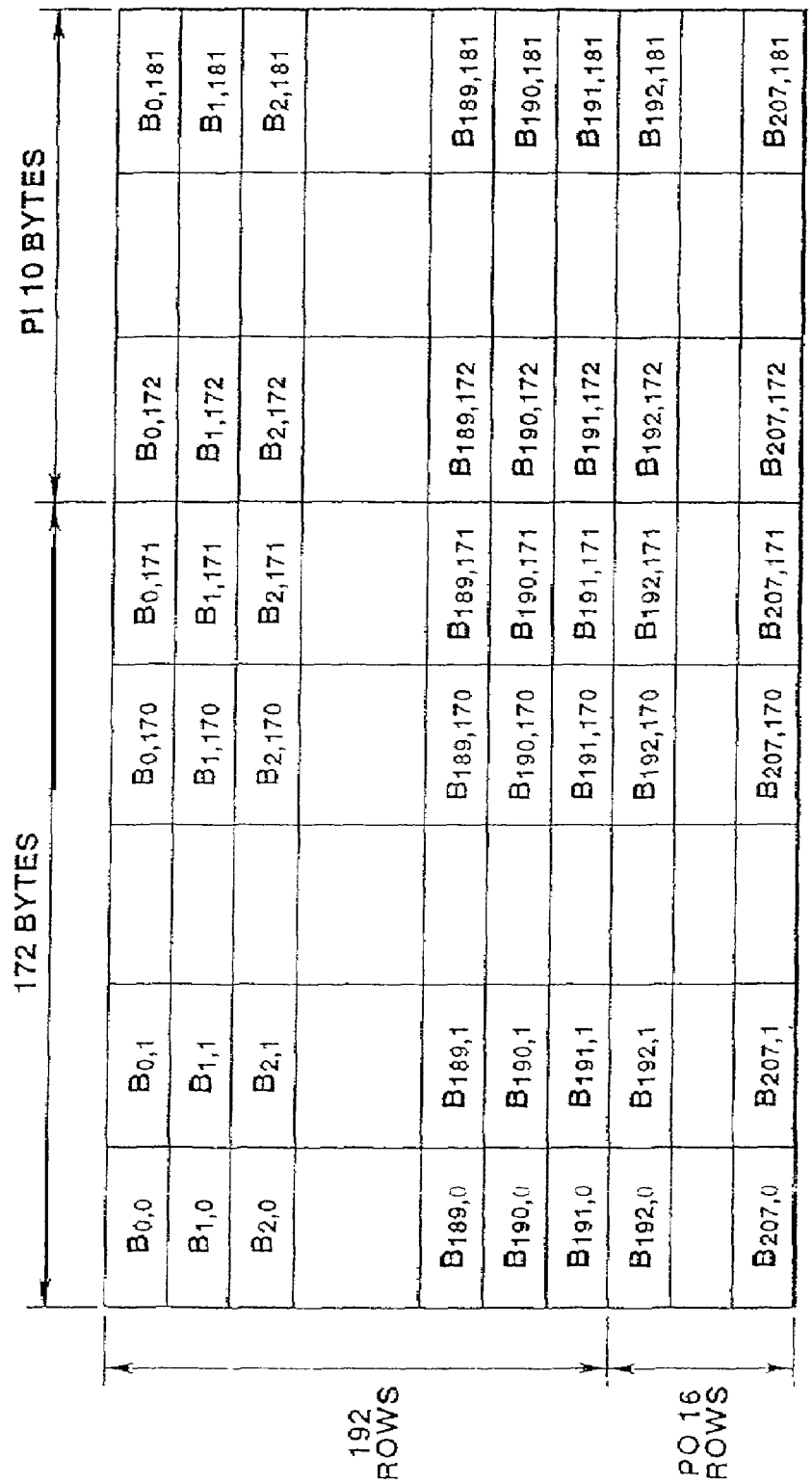
FIG. 11 is a view for describing another concrete example of an inner code/outer code of the double error correction codes.

In turn, the description will be oriented to an arrangement of an error correction coding circuit with a product code as shown in FIG. 11 with reference to FIG. 10.

In FIG. 10, the input data is applied to an input terminal 210. This input data is intended to be error-correction-coded. The input data is sent to a PO encoder 21 served as a first encoder. The input data applied to the PO encoder 211 consists of 192 rows each of which has 172 bytes, as shown in a matrix of $B_{0.0}$ to $B_{191, 171}$ of FIG. 11. The PO encoder 211 operates to add an outer code of RS (208.192.17) to the data consisting of 172 columns each of which has 192 bytes The outer code is a Reed Solomon (RS) code. The output data from the PO encoder 211 is interleaved by an interleaving circuit 212. Then, the interleaved data is sent to a data converting circuit 213 in which the data is converted for encrypting as mentioned above. Then, the converted data is sent to a PI encoder 214. As shown in FIG. 11, the PI encoder 214 operates to add an inner code (PI) of RS (182.172,11) for each 10 bytes to each 172-byte row of the data consisting of 208 rows to which the PO parity is added. Each row has 172 bytes. Hence, this PI encoder 214 operates to output the data consisting of 208 rows each of which has 182 bytes. Only the parity data (PI) of the output data is sent to a mixing circuit 18. This mixing circuit 18 receives the information data directly sent from the interleaving circuit 212 and adds the information data to the parity data (PI) sent from the PI encoder 214. The added data is taken out at an output terminal 216.

Then, the PO encoder 211 operates to add a PO parity consisting of 16 bytes to each 192-byte column of the input data and output the resulting data of 208 bytes to the interleaving circuit 212. The circuit 212 operates to interleave the data and supply the interleaved data to the data converting circuit 213. The circuit 213 operates to perform the foregoing data conversion with respect to the overall data of 208 bytes for encrypting the data. As mentioned above, the data conversion may be executed according to the key information applied to the terminal 218 as well.

As described above with reference to FIG. 5, the concrete data conversion may take a method of locating an inverter at a predetermined spot, selectively inverting the data according to the key information through the effect of a group of ExOR circuits, or using a group of AND, OR, NAND and NOR circuits. In addition to the 8-bit logic operation based on the one-bit key information or key data, the logic operation is carried out with respect to the 8-bit information data according to the one-bit key information or key data, the logic operation may be carried out with respect to the 8-bit information data according to the 8-bit key data. Moreover, the selective combination of AND, OR, ExOR, NAND, NOR and invert circuits may be used for each of 8 bits corresponding to one word of the information data. The combination itself may be used as the key. In addition to the logic operation, the inversion of changing a data location and the replacement of a data value may be used for the above-indicated data conversion. Besides, shift registers or various function operations may be used for the data conversion. Further encrypting methods may be applied to the data conversion. Or, the selective combination of these encrypting methods is made possible.

Figure 12:
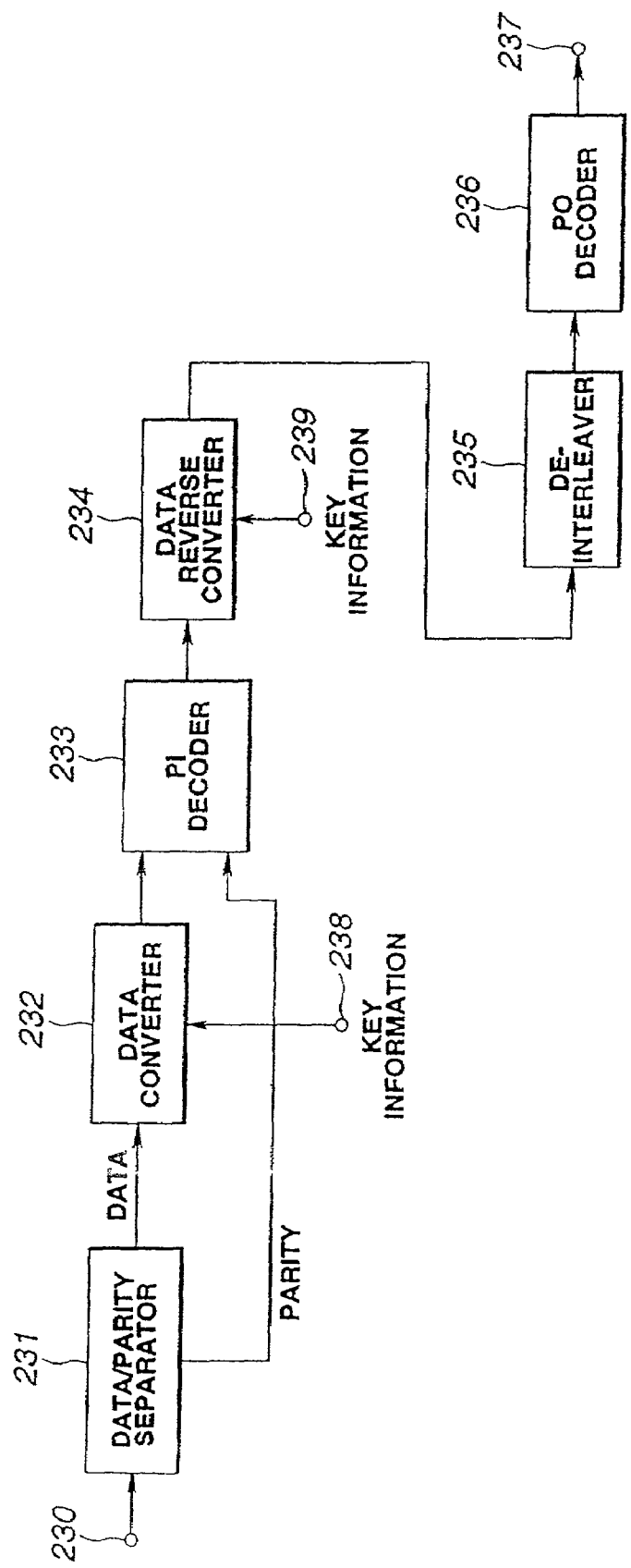
FIG. 12 is a block diagram showing another arrangement of the error correction decoding circuit.

In turn, the reverse process to the error correction coding process described with reference to FIG. 10 may be realized by the error correction decoding circuit arranged as shown in FIG. 12.

In FIG. 12, the data to be applied to an input terminal 230 corresponds to the output from the output terminal 216 of FIG. 10 That is, the data has a product code shown in FIG. 11 and consists of 208 columns each of which has 182 bytes. The data is supplied from the input terminal 230 to a data/parity separating circuit 231. The circuit 231 operates to separate the information data corresponding to the original data component from the parity data (PI). The information data is sent to a data converting circuit 232. The circuit 232 performs the same data conversion as the data converting circuit 232 shown in FIG. 10. The parity data and the output from the data converting circuit 232 are sent to the PI decoder 233. The PI decoder 233 performs the decoding process that is reverse to the process of the PI encoder 214 of FIG. 10, that is, the error correcting process with the PI code. The resulting data is made to be the data consisting of 208 columns each of which has 172 bytes. The output data from the PI decoder 233 is sent to a data reverse converting circuit 234. The circuit 234 performs the reverse process to the data conversion done by the data converting circuit 213 shown in FIG. 10. Then. The processed data is sent to a de-interleaving circuit 235. The circuit 235 performs the reverse process to the interleaving process done in the interleaving circuit 212 of FIG. 10, The processed data is sent to a PO (outer code) decoder 236. The decoder 236 operates to perform the decoding process that is reverse to the process of the PO encoder 211 of FIG. 10, that is, the error correcting process with the PO code. Then, the original data as shown in FIG. 11 consisting of 92 rows each of which has 172 bytes is taken at the output terminal 236. If the key information is used when doing the data conversion in the data converting circuit 213 of FIG. 10, the key information applied to the terminal 218 is supplied to the terminal 238 of the data converting circuit 232 and the terminal 239 of the data reverse converting circuit 234 so that the data reverse conversion may be carried out according to the key information.

The foregoing system is arranged so that only the parity data from the PI encoder 214 of FIG. 10 is mixed with all the non-converted information data when outputting the data. In place, it is possible to take the parity data from the PI encoder 214 as well as part of the information data and mix it with the remaining of the non-converted information data. In this case, the data/parity separating circuit 231 shown in FIG. 12 operates to separate the parity data and the part of the information data from the remaining information data. The remaining information data may be converted by the data converting circuit 232 In the example of FIG. 1, the data conversion is carried out before the PI encoder 214. In place the data conversion may be carried out before the PO encoder 211.

Figure 13:
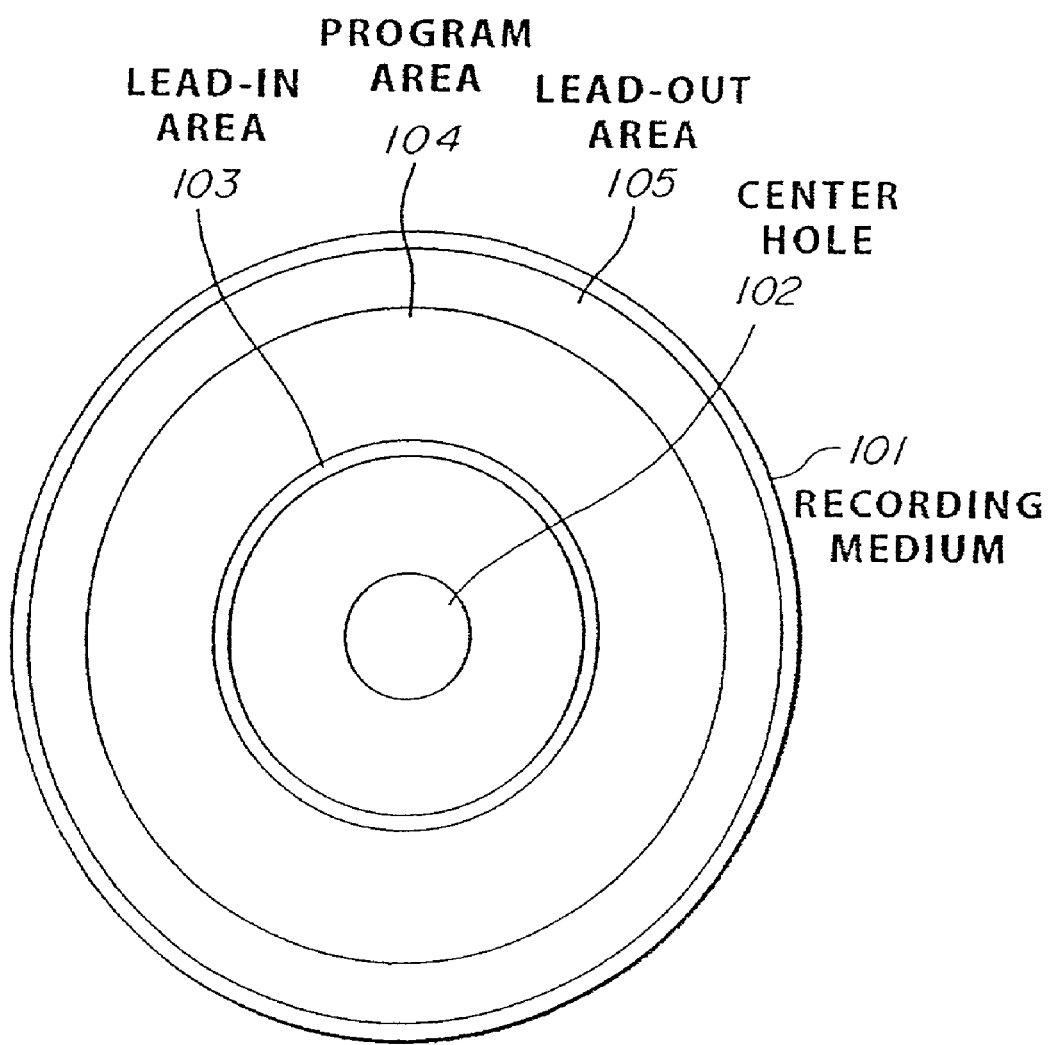
FIG. 13 is a view showing an example of a medium for recording data

In turn, FIG. 13 shows a disk record medium 101 such as an optical disk, which is an example of a record medium for recording the foregoing processed-data. The disk record medium 101 has a center hole 102 in its center. On the disk record medium 101 are formed a lead-in area 103 served as a TOC (table of contents) area for managing a program, a program area 104 for recording program data, a program terminating area, that is, the so-called lead-out area 105 ranged from the inner to the outer periphery of the medium. On the optical disk for reproducing an audio signal or a video signal, the program area 104 contains audio data or video data recorded thereon. The relevant information such as a time to the audio data or the video data is managed by the lead-in area 103.

As part of the key information or the key data, it is possible to use identifying information written on the area except the program area 104 for recording the data. Concretely, the identifying information which is provided the interface circuit 12 is written in the lead-in area 103 corresponding to the TOC area and the lead-out area 105 (not shown in FIG. 1). The identifying information contains a serial number proper to each medium, information for identifying a manufacturer, information for identifying a sales person, regional information like a country code, information for identifying a recording unit or an encoder, and identifying information proper to a medium manufacturing apparatus such as a cutting machine or a stamper. With the identifying information as the key information, the error correction coding block 13 shown in FIG. 1 performs the encrypting process. The encrypted signal is recorded on the program area 104 served as an area for recording a program. When reproducing the signal, the identifying information which is reproduced from TOC area by using the reproducing head 19 is used as the key information for decoding the encrypted signal. In place, it is possible to take the steps of physically or chemically writing the identifying information on the area inside of the lead-in area 103, reading the identifying information by using other reading apparatus when reproducing the data, and using the read identifying information as the key information for decoding the encrypted data.

According to the foregoing embodiments of the invention, the system may be arranged to focus on unidirectivity of generating an error correction code or an error detecting code. By using this unidirectivity for the encrypting process, the system may be applied to the use of data security. As shown in the illustrative example, the encrypting key consists of as many as one hundred and tens bits. By combining various logical circuits for each one byte, the encrypting key is made to have as several to tens times as numerous as that number of bits. It means that the key can be encrypted with many bits. This makes great contribution to improving the data security. Further, this kind of error correction coding circuit or error correction decoding circuit is realized within the hardware of the so-called LSI or IC chip. Hence, the ordinary persons have difficulty in accessing the circuits. This also makes great contribution to enhancing the data security.

The present invention is not limited to the aforementioned embodiments. For example, the combination with another encrypting process makes it possible to prevent the use of the information data even if the non-converted information data is output, thereby realizing stronger encryption. Further, the present invention may apply to the error correction coding process or the error correction detecting process.

What is claimed is:

1. A method for transmitting digital data on which an error correction or detection process has been performed, the method comprising:
   converting the digital data into encrypted data according to key data;
   generating parity data based on the encrypted data;
   mixing and transmitting the parity data with a data body, wherein at least a part of said data body is composed of an unconverted portion of the digital data;
   detecting an error location based on information data and the parity data;
   calculating an error value as a difference between the data before error correction and the data after error correction;
   providing the error value to a data modifying circuit that performs an operation using the error value to modify the data,
   wherein a first exclusive or (XOR) circuit operates to directly output information data sent from a delaying circuit when the first XOR circuit receives a binary zero digit from a latch circuit; and
   wherein a second exclusive or (XOR) circuit operates to output inverted information data from the delaying circuit when the second XOR circuit receives a binary one digit from the latch circuit.

2. A method as claimed in claim 1, wherein said data conversion comprises performing a logic operation on the digital data and the key data.

3. A method as claimed in claim 1, wherein said data conversion comprises replacing the digital data according to the key data.

4. A method as claimed in claim 1, wherein said data conversion comprises performing a function operation on the digital data according to the key data.

5. A method as claimed in claim 1, wherein said data conversion comprises performing a function operation on the digital data according to the key data.

6. A method as claimed in claim 1, wherein said error correction or error detection process is composed of a first coding process and a second coding process, the method comprising the steps of:

performing said data conversion after said first coding process, sending the resulting data to said second coding process, and transmitting at least partly data obtained by said second coding process.

7. A method as claimed in claim 1, wherein said error correction or detection process is composed of a first coding process and a second coding process, the method comprising the steps of:

performing said data conversion after the first coding process;

sending the resulting data to said second coding process;

returning parity data obtained by said second process to said first coding process; and transmitting information data and the parity data obtained by said first coding process.

8. A method as claimed in claim 1, wherein said error correction or detection process uses a convolution code.

9. A method as claimed in claim 1, wherein said error correction or detection process uses a product code.

10. An apparatus for recording on a record medium, digital data on which an error correction or detection process has been performed, the apparatus comprising:

means for entering key data;

conversion means for converting digital data into encrypted data according to the key data;

generating means for generating parity data based on the encrypted data;

mixing means for mixing the parity data with a data body for recording, wherein at least a part of said data body is composed of an unconverted portion of the digital data;

means for detecting an error location based on information data and the parity data;

means for calculating an error value as a difference between the data before error correction and the data after error correction;

means for performing an operation using the error value to modify the data;

a first exclusive or (XOR) circuit operates to directly output information data sent from a delaying circuit when the first XOR circuit receives a binary zero digit from a latch circuit; and a second exclusive or (XOR) circuit operates to output inverted information data from the delaying circuit when the second XOR circuit receives a binary one digit from the latch circuit.

11. A record medium having stored thereon a processing program, that when executed causes a reproducing apparatus to perform a method of transmitting digital data on which an error correction or detection process has been performed, the processing program comprising:

program code for converting the digital data into encrypted data according to key data;

program code for generating parity data based on the encrypted data;

program code for mixing and transmitting the parity data with a data body, wherein at least a part of said data body is composed of an unconverted portion of the digital data; and program code for detecting an error location based on information data and the parity data;

program code for calculating an error value as a difference between the data before error correction and the data after error correction; and program code for providing the error value to a data modifying circuit that performs an operation using the error value to modify the data;

program code for operating a first exclusive or (XOR) circuit to directly output information data sent from a delaying circuit when the first XOR circuit receives a binary zero digit from a latch circuit; and program code for operating a second exclusive or (XOR) circuit to output inverted information data from the delaying circuit when the second XOR circuit receives a binary one digit from the latch circuit.

12. An apparatus, for reproducing data recorded on a record medium, the data on which an error correction or detection coding process has been performed, the apparatus comprising:

means for reading from the record medium, parity data obtained by performing data conversion on information data treated in said error correction or detecting coding process according to key information and, information data at least partly composed of non-converted said information data;

means for inputting encryption key information indicating the information data on which said data conversion is performed when performing an error correction or detecting decoding process for said error correction or detection coding process;

means for detecting an error location based on information data and the parity data;

means for calculating an error value as a difference between the data before error correction and the data after error correction;

means for providing the error value to a data modifying circuit that performs an operation using the error value to modify the data;

a first exclusive or (XOR) circuit operates to directly output inflation data sent from a delaying circuit when the first XOR circuit receives a binary zero digit from a latch circuit; and a second exclusive or (XOR) circuit operates to output inverted information data from the delaying circuit when the second XOR circuit receives a binary one digit from the latch circuit.

13. The apparatus as claimed in claim 12, further comprising:

means for separating said read data into the information data and the parity data;

converting means for performing data conversion on said separated information data according to said encryption key information;

decoding means for performing a decoding process on said converted information data and said separated parity data; and reverse converting means for performing data conversion, reverse to said data conversion according to the encryption key information, of said decoded information data.

14. The apparatus as claimed in claim 12, further comprising:

means for separating said read data into information data and parity data;

converting means for performing data conversion with respect to said separated information data according to said encryption key information;

decoding means for performing a decoding process on said converted information data and said separated parity data and means for modifying said decoded information data with said separated information data.

* * * * *